March 6, 1934.        J. L. GIESSER        1,949,712
PRESSURE INDICATOR FOR PNEUMATIC TIRES
Filed Oct. 18, 1932        2 Sheets-Sheet 1
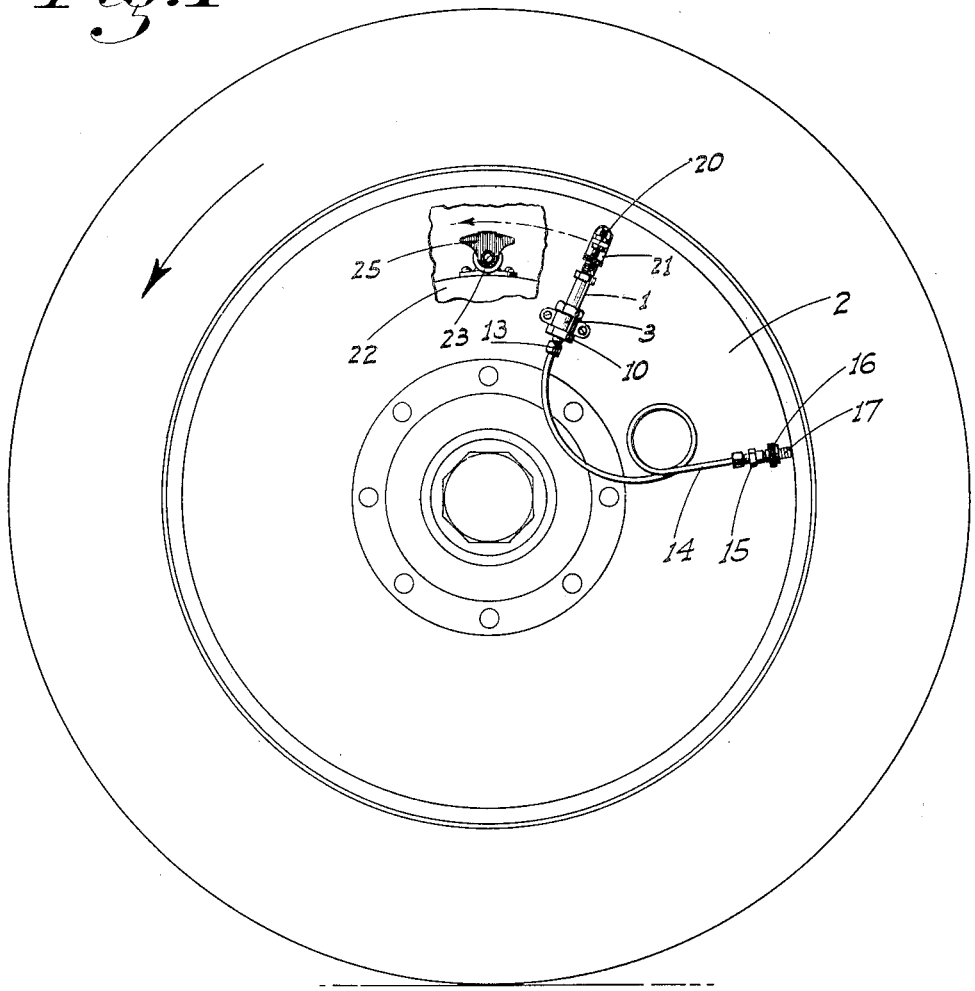
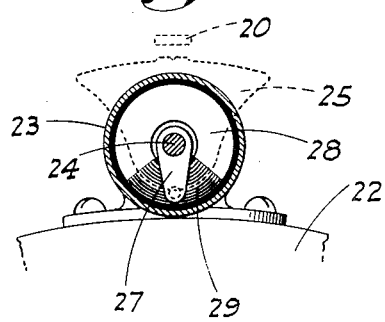
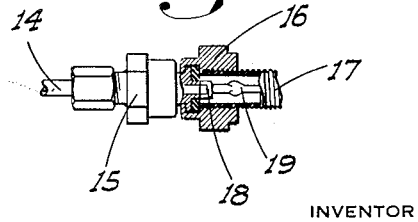
INVENTOR
J. L. Giesser
BY
ATTORNEY March 6, 1934.    J. L. GIESSER    1,949,712
PRESSURE INDICATOR FOR PNEUMATIC TIRES
Filed Oct. 18, 1932    2 Sheets-Sheet 2
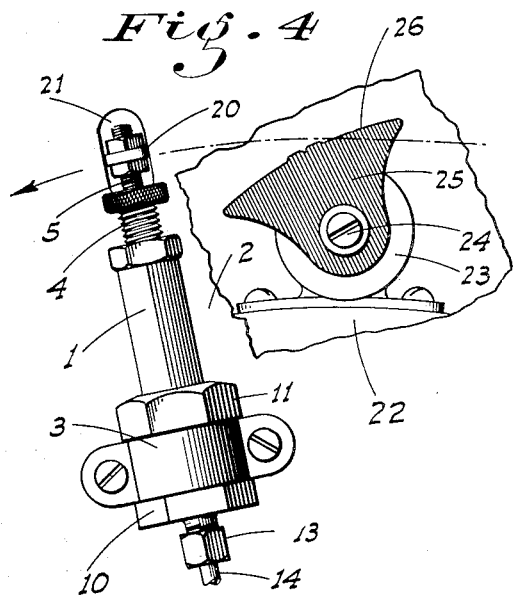
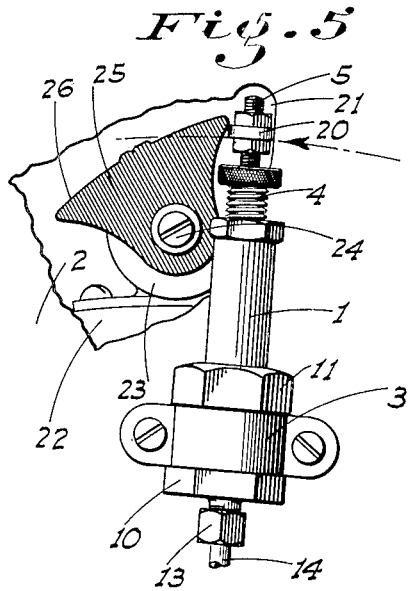
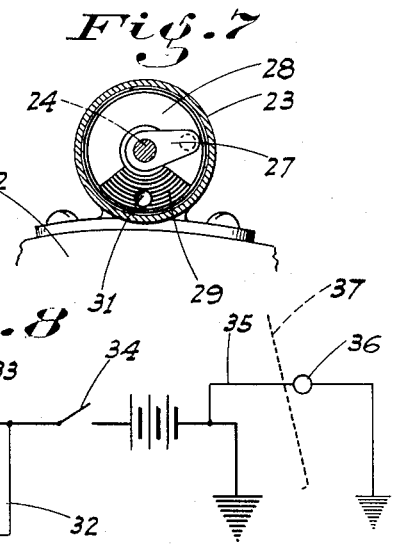
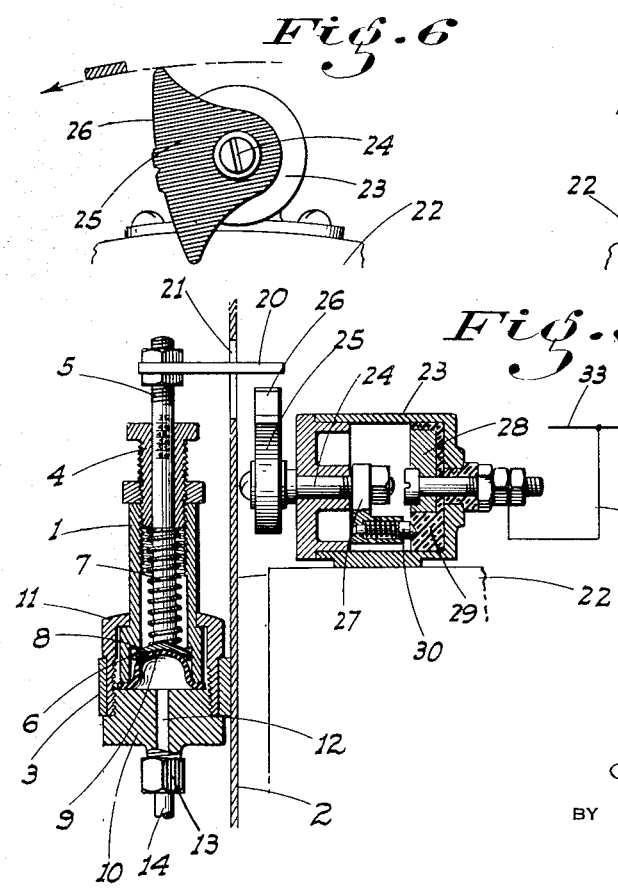
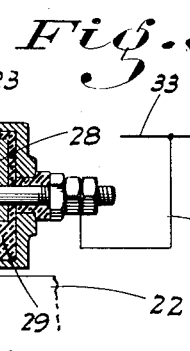
INVENTOR
J. L. Giesser
BY
ATTORNEY Patented Mar. 6, 1934

1,949,712

UNITED STATES PATENT OFFICE 1,949,712

PRESSURE INDICATOR FOR PNEUMATIC TIRES

Joseph L. Giesser, Sacramento, Calif.

Application October 18, 1932, Serial No. 638,303

4 Claims. (Cl. 200—58)

This invention relates to pressure indicating devices for pneumatic tires such as are mounted in connection with the different wheels of the vehicle and which, upon the pressure being lowered in the tires to a detrimental or dangerous degree gives a visible signal to the driver of the vehicle of this tire condition.

The device includes an electric signal lamp interposed in a normally open circuit and the main object of my invention is to provide a device of this general character in which the circuit closing mechanism is so designed that it has no continuously contacting surfaces and there is no wear or movement of any part except during the actual closing of the switch of the circuit, so that no upkeep costs for replacement and repairs are ever necessary under ordinary conditions.

The advantages of such equipment on a motor vehicle are of course manifold. The operator never has to stop to test his tires, an operation which takes time and is sometimes inconvenient and is unpleasant in inclement weather. He is at the same time assured that all his tires are properly inflated as long as the signal light remains dormant. The signal being given as soon as the tires become under-inflated rather than actually flat—a condition which is not usually noticed—the operator will know without any guess work that they require air and can attend to the same. There will be no tendency for him to forget that such inflation of the tires is required since the signal light will continue to glow until the air is replaced and there is no other way to cut the signal out. As a result the tires may be easily kept in a properly inflated condition and will of course wear longer. Should an adjustment for different pressures ever be desired this can be very quickly accomplished without the use of any tools or without any separate pressure gauge being necessary.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views:

Fig. 1 is a side elevation of a disc wheel partly broken out showing my improved pressure indicator device installed thereon.

Fig. 2 is a sectional view of the switch member of the device showing the movable contact arm in the position occupied in Fig. 1.

Fig. 3 is a sectional view of the detachable coupling connection between the conduit of the pressure device and the valve stem of the tire.

Fig. 4 is a fragmentary side view of the wheel disc partly broken out showing the initial turning of the switch toward a closing position by the pressure control arm with the rotation of the wheel and when the tire pressure has been lowered beyond a certain point.

Fig. 5 is a similar view showing the engagement of the switch actuating member and the pressure control arm of the device with a subsequent rotation of the wheel from the position shown in Fig. 4.

Fig. 6 is an external view of the switch member showing the position of the actuating member thereof after being turned by the pressure controlled arm from the position in Fig. 5.

Fig. 7 is a sectional view of the switch showing the position of the movable contact arm when the exterior actuating member is in the position shown in Fig. 6.

Fig. 8 is a transverse section of the complete mechanism of the device, in connection with the signal circuit, and with the pressure in the tire at normal.

Referring now more particularly to the characters of reference on the drawings, the pressure controlled unit of the device comprises a barrel 1 adapted to be disposed radially of the wheel on the outside of the disc 2 or other body thereof and secured thereto by suitable means such as a clamping strap 3. The barrel is tubular and tapped and is provided on its outer end with an adjustable screw 4 which forms a guide and bearing for a stem 5.

The lower end of the stem is formed with an enlarged head 6, a compression spring 7 being disposed about the stem and extending between the head and the adjacent end of the screw. Outward movement of the stem is limited by a shoulder 8 in the barrel toward the bottom and against which the head may bear. An elastic rubber diaphragm 9 bears against the head and is clamped all around its periphery between the barrel and its bottom cap 10 in an air-tight manner by a releasable nut 11 on the barrel.

The cap has a passage 12 therethrough which communicates with a fitting 13 mounted on the outside of the same and which is connected to the adjacent end of a length of flexible tubing 14. The opposite end of the tubing is connected to a tubular fitting 15 which includes a turnable tapped finger element 16 adapted to screw onto the tire valve stem 17 in place of the usual cap. The fitting 15 has an integral projection 18 adapted, when the element 16 is tightly screwed onto the stem, to depend and engage the stem 19 of the valve insides, as shown in Fig. 3.

By reason of this construction it will be seen that the air pressure in the tires is imparted to the diaphragm expanding the same and consequently lifting the stem 5 against the pressure of the spring. The pressure necessary to thus lift the stem through its full stroke is governed by adjusting the screw 4, the stem being graduated as shown so that the screw may be easily set so that the device will definitely operate with different pressures. It may here be remarked that it is not intended that one spring shall be used for all pressures between the relatively low pressures of ordinary balloon tires of automobiles and the high pressures of truck and similar tires. Springs of different strength will be used for the different types of service, each spring having a working range between 30 and 40 pounds or whatever range may be desired. The remainder of the unit however can be used without change for all purposes.

Secured on the outer end of the stem 5 is an arm 20 which extends transversely of the wheel and radially of the stem through a radial slot 21 in the disc 2. The purpose of this arm will appear shortly. Rigidly fixed in a suitable manner on the stationary brake drum housing 22 back of the wheel is a switch housing 23, having a stem 24 turnably mounted therein and projecting therefrom toward the wheel, the axis of said stem being parallel to that of the wheel. I have here shown the housing securing means as consisting of ears directly engaging the brake housing but it will be understood that different forms of securing means will be necessary for use on different types of brake housing construction. Secured on the outer end of the stem 24 is a block 25 having a convexly curved cam surface 26 on its outer edge. This block and said surface is segmental only and has a radius considerably smaller than that of the wheel.

At the ends of said curved surface the block is sharply undercut for a purpose which will be seen later. This cam member is disposed in the transverse plane of the adjacent end of the arm 20 and said edge 26 normally faces outwardly or away from the axis of the wheel and is disposed inwardly of the path of the arm 20 when the tire pressure is normal. The stem 24 inside the housing 23 carries a radial contact arm 27 adapted to engage a signal contact strip 28 mounted in the housing in insulated relation thereto. Said contact arm is positioned to engage the contact 28 when the cam block has been turned a certain amount from its normal position, but engages an insulation surface 29 when said cam block is in said normal position. The contact arm 27 is provided with a spring pressed pin 30 normally engaging a depression 31 in the insulation surface 29 so that the cam block is yieldably held in its normal upright position.

The strip 28 is suitably connected by a wire 32 with the ignition circuit 33 of the vehicle on one side of the switch 34 of said circuit. Another wire 35 is connected to the circuit 33 on the opposite side of the switch and leads to one terminal of a signal light 36 mounted on the instrument panel 37 of the car. The other terminal of the lamp is grounded as is customary in motor vehicle practice and the housing 23 and stem 24 are also grounded on the brake housing. There are of course individual pressure controlled and switch units associated with all four wheels and I may either use a signal light common to all the units or separate lights for each unit as may be found desirable.

The advantage of connecting the signal circuit with the ignition circuit of the car is that the need of an additional switch is avoided and the signal circuit is always in operating order whenever the engine is running so that the operator does not have to give any thought to setting the device ready for operation. Also as soon as the engine is stopped the signal circuit is definitely thrown out of operation thus avoiding the possibility of the signal light burning continuously and running the battery down when the car is stored for some length of time and one or the other of the tires become deflated without being noticed during such period of storage.

In installing the device the barrel 1 is mounted in such relation to the cam block in the normal position of the latter that the arm 20 when the stem 5 is fully extended, freely clears the cam. When the pressure drops a predetermined amount said arm with the rotation of the wheel engages the cam block towards its center of length (on account of the relatively short radius of curvature of the latter) and turns the same sufficiently to raise or move one end of said block outwardly of the circular path of movement of the arm 20 as shown in Fig. 4. Then with a subsequent rotation of the wheel the arm 20 engages the cut away portion of the cam block under said raised end as shown in Fig. 5. It will then turn the cam block sufficiently further as shown in Fig. 6 to cause the contact arm 27 to engage the contact strip 28 as shown in Fig. 7. The circuit to the signal light is thus closed and the operator of the car will be notified that the tire needs inflation.

Upon such inflation being carried out the stem 5 is automatically extended to its outward position and when the cam block is again turned to its normal position (which may be done in connection with the inflating operation) the switch will not again close until the tire becomes again under-inflated. The cam block and switch are of symmetrical form on both sides of the vertical axis of this unit so that they may be operated with the rotation of the wheels of the vehicle in either direction. This also avoids having to make right and left hand switch units for use on opposite sides of the vehicle.

Though I have shown this device as being mounted in connection with a disc wheel it will be obvious that the barrel 1 can be strapped to wood or wire spokes in substantially the same manner as to a disc.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In a pressure signaling device for pneumatic vehicle tires, a rotary member mounted back of a tired wheel on a relatively stationary part of a vehicle, a normally open switch closed by rotation of said member a predetermined amount, a pressure actuated element mounted on said wheel for rotation therewith in position to engage and rotate said member a certain portion of said predetermined amount with the rotation of the wheel and when the tire pressure is below a predetermined normal, and means formed with said member whereby it will be rotated the balance of said predetermined amount with the following rotation of the wheel.

2. In a pressure signaling device for pneumatic vehicle tires, a rotary member mounted back of a tired wheel on a relatively stationary part of a vehicle, a normally open switch closed by rotation of said member a predetermined amount, a pressure actuated element mounted on said wheel for rotation therewith in position to engage and rotate said member when the tire pressure falls below a predetermined normal, and means formed with said member whereby it will be rotated said predetermined amount by said element only with successive rotations of the wheel when said element occupies a certain position dependent on a predetermined subnormal pressure, and will be rotated said predetermined amount with a single rotation of the wheel when the element occupies another position as determined by a different subnormal pressure.

3. In a pressure signaling device for pneumatic vehicle tires, an arm mounted in connection with a tired wheel for radial movement and extended transversely thereof to the back of the same, air pressure means to move the arm outwardly, means to move the arm inwardly in opposition to the air pressure, a normally open signal switch mounted on a relatively stationary member of the vehicle, and means to close the switch including a rotatable segmental member having relatively abrupt ends pivoted in connection with said switch and lying in the transverse plane of the adjacent end of the arm with its outer edge in position to be frictionally engaged and rotated by said arm and clear of the path of the latter when the arm has moved inwardly from a normal-pressure position a certain distance; said edge being curved convex with the wheel but on a smaller radius whereby the ends of said edge are normally closer to the center of the wheel than the central portion so that the arm will first engage said edge toward its center of length and will turn the same so that one end of the member projects outwardly of the path of rotation of the arm for engagement thereby with a subsequent rotation of the wheel.

4. In a pressure signaling device for pneumatic vehicle tires, an arm mounted in connection with a tired wheel for radial movement on the back side thereof, air pressure means to move the arm radially in one direction, means to move the arm in the opposite direction in opposition to the air pressure, a normally open signal switch mounted on a relatively stationary member of the vehicle, and means to close the switch including a rotatable segmental member having relatively abrupt ends pivoted in connection with said switch and lying in the transverse plane of the adjacent end of the arm and having one edge in position to be frictionally engaged and rotated by said arm and clear of the path of the latter when the arm has moved from a normal-pressure position a certain distance; the contour of said edge relative to the path of rotative movement of the arm being such that only the central portion of said member will initially project into the path of rotation of the arm for engagement thereby, so that said member will then be turned a certain distance, and so that after such turning one end of the member will project into the path of rotation of the arm for engagement thereby with a subsequent rotation of the wheel.

JOSEPH L. GIESSER.